United States Patent [19]
Rojek

[11] Patent Number: 5,275,679
[45] Date of Patent: Jan. 4, 1994

[54] PROCESS TO FORM A PRESSURE RELEASE HOLE WITH REMOVABLE SEAL, FOR EASY OPENING, ON METAL LIDS FOR VACUUM SEALING OF GLASSES AND OTHER GLASS CONTAINERS USED TO PACK FOODSTUFF

[75] Inventor: Arnaldo Rojek, Sao Paulo, Brazil

[73] Assignee: Metalgrafica Rojek Ltda., Cajamar, Brazil

[21] Appl. No.: 888,175

[22] Filed: May 26, 1992

[30] Foreign Application Priority Data

Sep. 10, 1991 [BR] Brazil .................. 9103896

[51] Int. Cl.⁵ ............................................. B32B 31/00
[52] U.S. Cl. ...................... 156/250; 156/293; 156/303.1; 264/154; 264/248; 264/268; 264/294; 426/87; 426/401; 83/108; 83/103; 83/100; 83/25
[58] Field of Search ............ 156/250, 69, 214, 293, 156/303.1; 264/248, 294, 106, 154, 268; 426/87, 401; 83/108, 103, 100, 31, 25

[56] References Cited

U.S. PATENT DOCUMENTS

| | | | |
|---|---|---|---|
| 1,028,156 | 6/1977 | Clark et al. | 156/303.1 |
| 3,183,284 | 5/1965 | Haberlin | 264/268 |
| 3,606,997 | 9/1971 | Guckel | 426/401 |
| 3,736,899 | 6/1973 | Manske | 426/87 |
| 3,767,076 | 10/1973 | Kennedy | 156/69 |
| 3,844,861 | 10/1974 | Irish, Jr. | 156/250 |
| 4,130,213 | 12/1978 | Wszolek | 264/268 |
| 4,227,954 | 10/1980 | Ward et al. | 156/250 |
| 4,343,754 | 8/1982 | Wilde et al. | 264/268 |
| 4,401,534 | 8/1983 | Geopp et al. | 264/268 |
| 4,645,557 | 2/1987 | Pedersen | 156/250 |
| 4,675,139 | 6/1987 | Kehe et al. | 156/268 |
| 4,965,035 | 10/1990 | Ishiwatari et al. | 156/268 |
| 4,971,745 | 11/1990 | Ferenc et al. | 264/268 |
| 4,991,731 | 2/1991 | Osip et al. | 156/69 |
| 5,118,454 | 6/1992 | Preston | 264/154 |
| 5,137,164 | 8/1992 | Bayer | 264/268 |

*Primary Examiner*—Patrick J. Ryan
*Assistant Examiner*—Merrick Dixon
*Attorney, Agent, or Firm*—Dvorak and Traub

[57] ABSTRACT

A a lid for sealing a container. The lid adheres to the container by no more than a vacuum formed within the container. The lid is formed of a substantially circular panel having a flanged perimeter and a concave depression on an upper side of the circular panel. A pressure release hole extends through the concave depression of the circular panel and sanitary varnish is disposed on a lower side of the circular panel. A first adhesive material is applied to the lower side of the lid by fusion to the sanitary varnish to form a thin film over the release hole, and a second adhesive material is disposed in the concave depression on the upper side of the lid to form a removable seal. The second adhesive material has the same properties as the first adhesive material.

3 Claims, 3 Drawing Sheets

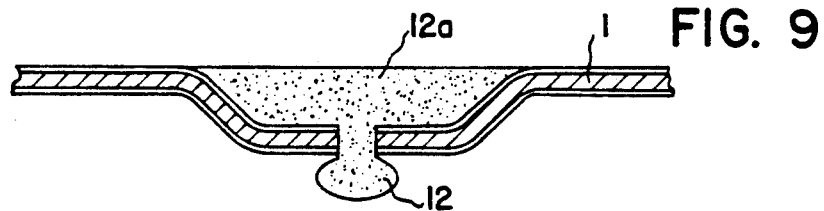
FIG. 9
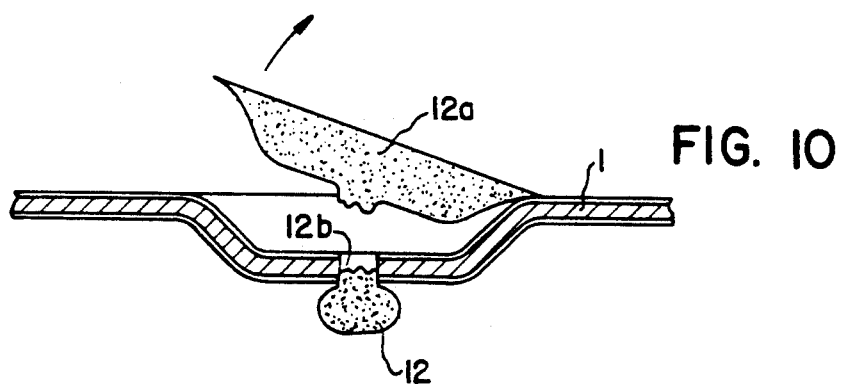
FIG. 10
FIG. 11
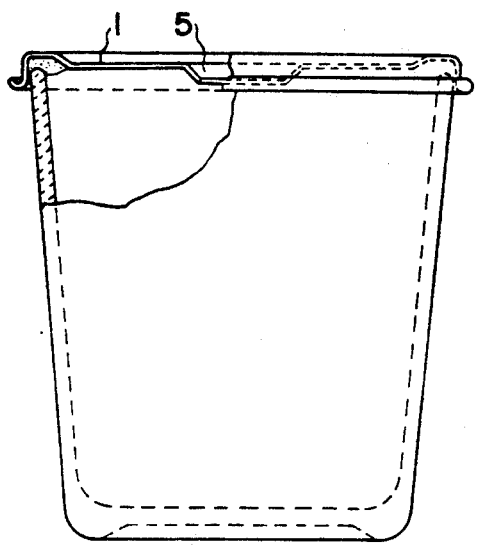
FIG. 12
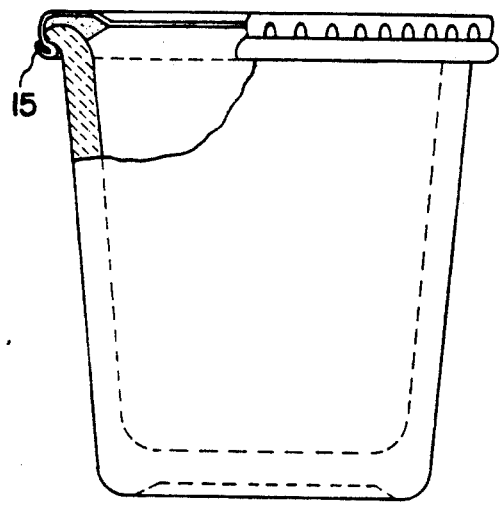

PROCESS TO FORM A PRESSURE RELEASE HOLE WITH REMOVABLE SEAL, FOR EASY OPENING, ON METAL LIDS FOR VACUUM SEALING OF GLASSES AND OTHER GLASS CONTAINERS USED TO PACK FOODSTUFF

FIELD OF THE INVENTION

This invention is related to and is the object of a process to form a pressure release hole, with removable seal, for easy opening, on metal lids for vacuum sealing of glasses and other glass containers used to pack foodstuff.

The metal lid, provided with a hole and removable seal, obtained with this production process, has a purpose to provide a lid which may be easily opened, without the use of any special tool or instrument, with such lids being used for vacuum sealing of glasses and other glass containers used to pack foodstuff, particularly those in which the product is filled at high temperature, with the sealing of such packings being achieved by steam jets, from which, after the cooling of the product and the condensation of the steam contained within the containers, vacuum is formed, resulting in the air tight sealing of such packing devices.

BACKGROUND OF THE INVENTION

This metal lid, for which a new process to make the pressure release hole was created, with a removable seal, the removal of which allows the easy opening of the container, by the elimination of the internal vacuum of the container, is formed by a metal lid of the common, known type, usually made of aluminium or iron sheet plate, constituted by a circular panel with a downward turned rim, having, along its inner peripherial circumference, a circular groove containing a sealing gasket, made of a resin-like material, such as "plastisol" or other similar material, used to create a type of seat on the rim of the glass or of the other glass container, with said metal lid not being part of this invention.

This type of metal lid has been used, normally, to seal glass containers to pack different foodstuff, and the sealing being achieved by beading and by the use of special clamps, with such a system requiring the use of thick-walled glass containers, and, also, such containers having a beading in its rim, in order to co-operate with the downward rim of the lid, during the beading process, a process that, besides being uneconomic, due to the use of larger quantities of material for the containers, harms its visual aspects, due to the heavy appearance, which is not proper for the later use of the container as a common water glass, a use which is a sale promotion for the product.

With the improvement and evolution of such type of packings, namely, those containers formed by glass tumblers, their sealing has been normally achieved by vacuum, in other words, the vacuum formed within the packing container is used as a sealing element and lid fixing element, for its air-tight sealing, therefore excluding the use of clamps and beading machines, this being a considerable improvement for such glass containers, mainly those shaped as tumblers, for they were not subject to the pressure and impact of beading clamps any more, and with the containers being made with relatively thin walls, eliminating the need of a heavy rim or bead at the open mouth, offering them a better look and the best possibility of being used as domestic drinking glasses, with the same conditions of the glass tumblers made for drinking purposes.

However, even considering the new sealing system of a metal lid as more economic and offering a better look to the packed products, offering the opportunity of a later use of the glass container as a drinking glass, it still requires, for the opening or removal of the lid, the use of a pointed instrument, such as a pointed knife, to be introduced under said rim or skirt of the metal lid, in order to achieve the elimination of vacuum and the total opening or removal of the lid, and such an operation not only makes it difficult to open the packings, but may create a possible hazard to the operator's hands.

SUMMARY OF THE INVENTION

In order to provide better conditions for an easy opening, without the need of any other tool or instrument, a metal lid with a hole and a removable seal was developed, the characteristics of which, for manufacture and use, are the object of this invention, and provide a total guarantee against any violation of the packing, especially in the sale stations, because the process for the opening of the pressure release hole and the placing of the removable seal does not allow the replacement of the seal after the lid is taken out, showing, immediately, an eventual violation of the product in the sale station, because once the vacuum is eliminated, by the removal of the seal, the lid becomes free and the product is not accepted by the purchaser.

Another advantage of the new process to make the pressure release hole and respective removable seal is that, thanks to the previous application, on the inner face of the lid and in the opening which forms the hole, of a thin film or membrane, of the same resin-like material ("plastisol" or similar material), which forms the seal, with such film closing said hole, in its lower portion, therefore not allowing the entering or attack of any acid substances from the products against the portion of the lid, in the hole, which remains uprotected by the finishing varnish, avoiding, also, that the seal forming material, when applied in a fused state on the concave area where the hole is made, enters the hole, forming a small bead or residue of such material in the lower face of the lid, which could constitute an obstacle for the easy and total removal of the seal from the breathing hole, therefore harming the perfect performance of the hole's function in the elimination of vacuum from the interior of the packing and easy opening and removal of the lid.

BRIEF DESCRIPTION OF THE DRAWINGS

The new process to form a pressure release hole with removable seal, for easy opening of metal lids for vacuum sealing of glasses and other glass containers used to pack foodstuff is represented in the attached drawings, where:

FIG. 9—Cut-out view, enlarged and in detail, of a portion of the metal lid, showing, for comparison purposes, an already known and inconvenient process to form the pressure release hole with seal, through which the running-out of the resin-like material, when in liquid state, occurs towards the lower portion of the hole, not protected by the thin film of resin-like material, therefore forming, after its solidification, a bead or portion of residues on said portion, making difficult or impossible the total removal of the seal from the pressure release hole;

FIG. 10—The same view of the Figure above, showing the harmful effects derived from the formation of the bead or residues in the lower portion of the hole, upon the removal of the seal;

FIG. 11—Lateral view, with partial cut, of a glass-packing tumbler, closed by a metal lid under vacuum, with the vacuum or pressure release hole and seal, obtained through the new process, for easy removal of the lid, a process which allows the use of thin-wall glass tumblers, without the need of beadings or heavy rims, thanks to the elimination of the need to use beading or flanging clamps;

FIG. 12—Lateral view, with partial cut-out portion, showing, for comparison and elucidation purposes, a closed glass tumbler packing unit, the metal lid of which is closed by the beading or flanging operation with the use of a special clamp, requiring the use of glass containers with heavy rims.

DETAILED DESCRIPTION OF THE PREFERRED EMBODIMENT

Figure 1:
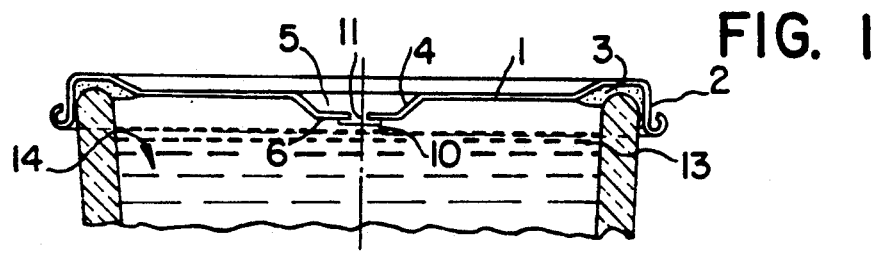
FIG. 1—Lateral view and diametral cross-section, showing the metal lid with the pressure release hole and removable seal, obtained by the new manufacture process, with the lid applied through vacuum effect on the mouth of a packing glass, full with the product.

Describing, with more details, this invention, and following the attached drawings, the metal lid used for vacuum sealing of glass tumblers or other glass containers, having a pressure or vacuum release hole with a removable seal, for easy opening, it is noticed that such metal lid, normally formed by a circular panel (1) made out of aluminium or iron sheet plate, with a downward flange or rim (2), with a groove, in its internal periphery, to contain a sealing gasket (3) made out of resin-like material, such as "plastisol" or similar compound.

Such metal lid, normally used for vacuum sealing of glass tumblers used for the packing of foodstuff, has, at a preferably central portion of its panel (1), a concave circular depression (4) destined to receive a drop of the resin-like material, in liquid and melted state, such as "plastisol" or a similar compound, to form a removable seal (5), which will act as a seal for the pressure of vacuum release hole (6) made on the bottom and central portion of said concave portion (4).

Figure 5:
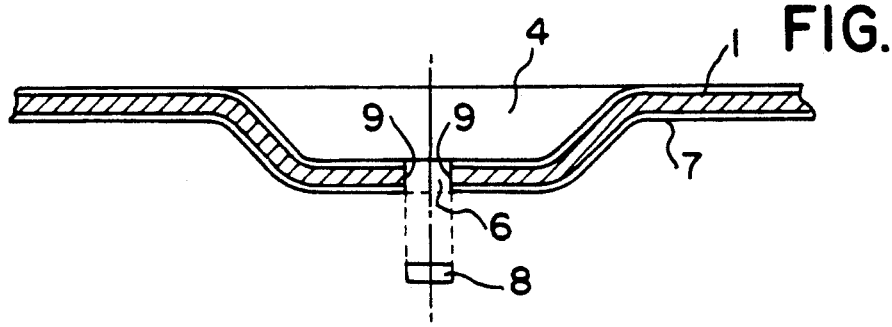
FIG. 5—Cross-section view, showing, enlarged, a central portion of the metal lid panel, where, following the principles of this new process, the pressure release hole is made, by removing a circular portion from the material forming the metal lid.

According to the process for the making of said pressure or vacuum release hole (6) in the panel of the metal lid (1), which is normally lined in its lower face by a thin film of sanitary varnish (7), and in the center portion of said concave depression (4), a hole (6) is made, by removing a disk portion (8) out of the lid-forming metal panel (1), by a punching process, as shown, in detail, in FIG. 5 of the drawings, with the inner and cut edges (9) of said hole remaining unprotected by said sanitary and protective varnish film (7).

Figure 6:
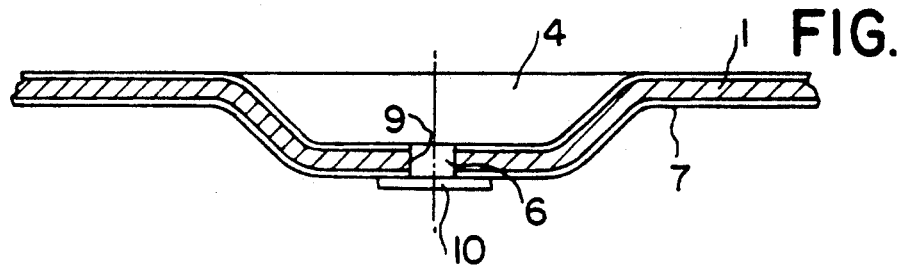
FIG. 6—The same view, in enlarged detail, of the Figure above, showing a subsequent phase of the process, through which the lower portion of the hole is closed by a thin film of resin-like material ("plastisol" or similar material), of thermo-plastic and melting characteristics.

In a subsequent operation of the process, shown in detail in FIG. 6, in the lower portion of the hole (6) and in its cut edge, a thin film (10) of the resin-like material ("plastisol" or similar compound) is applied, having the same thermo-plastic characteristics of the resin-like material which forms the seal (5), and such film, due to its thermo-plastic characteristics, fuses itself to the varnish film (7) lining the lower face of the lid panel (1), therefore forming a seal in said lower portion of the hole (6) and, at the same time, it eliminates the possibility of a contact with the cutting edges (9) of the hole with the internal or lower portion of the metal lid panel (1), therefore eliminating the possibility of contact with acid substances of the products in said portion (9) of the hole, which is not protected by the sanitary varnish.

Figure 7:
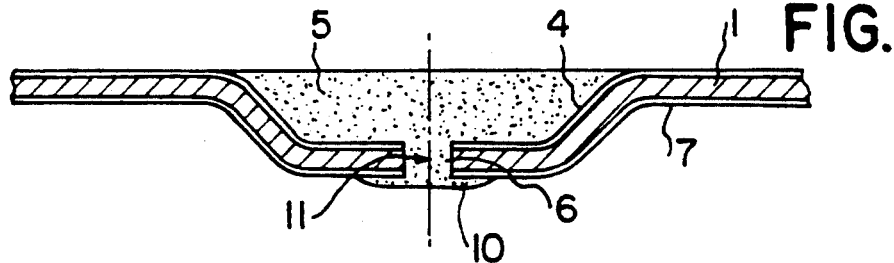
FIG. 7—The same view, in enlarged detail, of the Figure above, showing, in a subsequent operation of the process in question, the application of the resin-like material ("plastisol" or similar material) in liquid or fused state, which will form the removable seal, filling of the hole and merging by melting together, with the thin film applied to the lower portion of the pressure release hole.

After the application of said film (10) which seals the hole (6) in its lower portion and in its cutting edge, in a subsequent operation shown in detail in FIG. 7 of the drawings, a drop of the resin-like material "plastisol" or similar compound having the same characteristics of the material forming the thin film (10) is applied to the concave circular depression area (4), penetrating into the hole (6), and fusing, through the stem portion (11), to the thin film (10), as shown in detail in Figure 7 of the drawings. Such a process avoids and blocks the running or pouring out of the resin-like material forming the seal (5), when applied in liquid and fused state to the concave depression (4), towards the lower portion of the hole (6), with the previously applied thin film (10) avoiding such running or pouring out, which could form a bead (12) or a residual drop of the resin-like material through the lower portion of the hole, as shown, for elucidative purposes, in FIG. 9, a fact which could harm the easy and total removal of the seal (12a) upon the removal of the lid, as shown in FIG. 10, with the consequent difficulty in liberating the vacuum release hole (12b) and the consequent elimination of vacuum formed within the packing container, and making difficult the removal of the lid.

As it is noticed, from this process of making the vacuum release hole and respective removable seal, besides avoiding the running or pouring out of the resin-like material ("plastisol" or similar compound) which forms the seal (5) in the hole (6), applied in the liquid or fused state within the concave region (4), thanks to the previous application of the thin film (10) to the lower portion of the hole (6), this operation allows that such a thin film (10) will provide, at the same time, a total protection of the cutting edges or rims (9) of the hole, which are not protected by the sanitary varnish, therefore avoiding the attack, by acids contained in the packed product, which could cause rust or oxidation of the metal lid, a condition particularly important to lids made out of iron sheet, which are economically advantageous when compared with aluminium lids.

Figure 2:
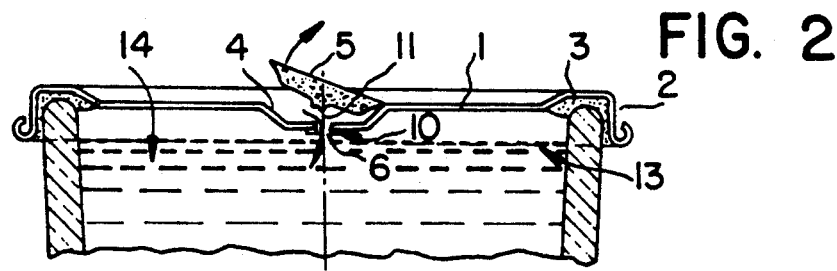
FIG. 2—The same lateral view in diametral cross-section, showing the metal lid at the moment of the removal of the seal from the pressure release hole, therefore eliminating the vacuum in the interior of the package.
Figure 3:
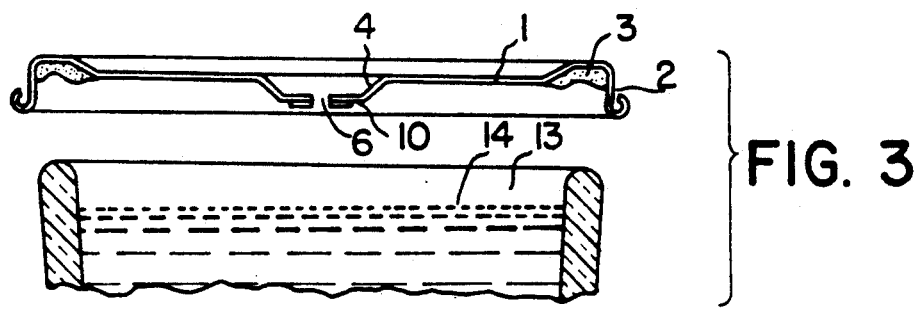
FIG. 3—The same lateral view in diametral cross-section, showing the metal lid out of the packing glass, providing easy opening of the volume.
Figure 4:
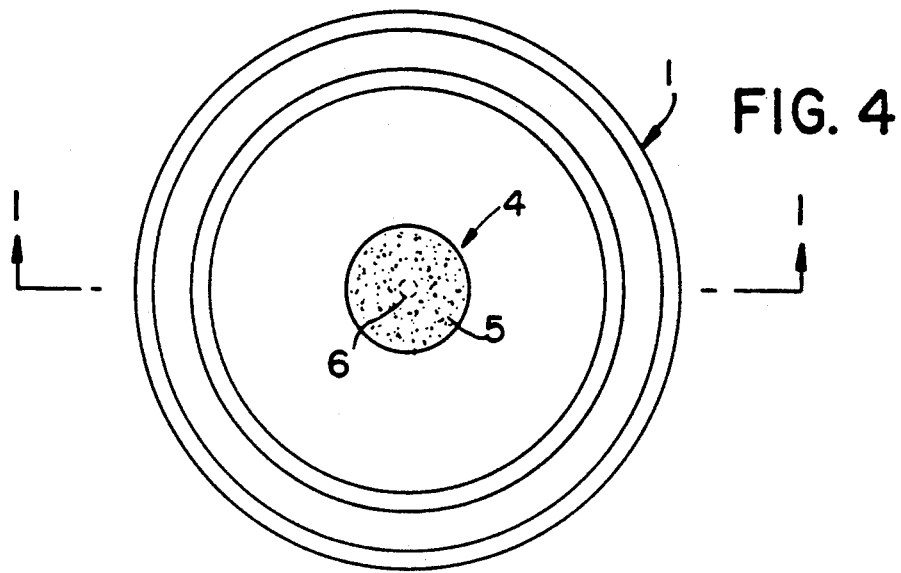
FIG. 4—A top view of the metal lid, with the pressure release hole and removable seal.
Figure 8:
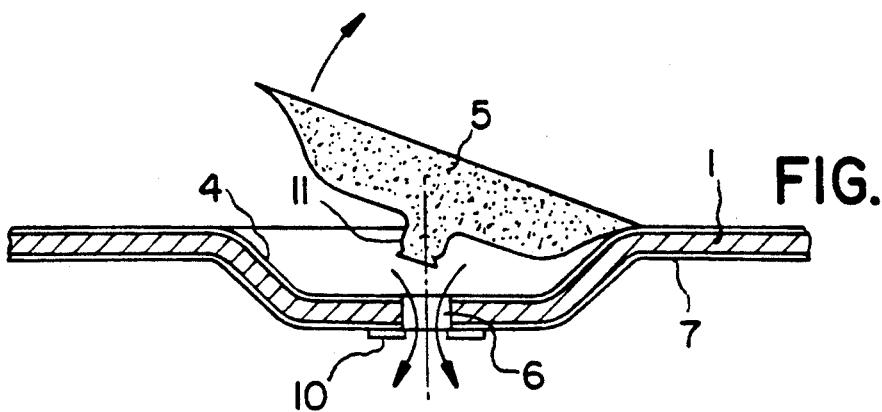
FIG. 8—The same view, in enlarged detail, of the above Figures, showing the moment of removal of the seal from the hole, breaking up the end portion of the sealing material contained within the hole and which was connected to the thin film applied to the lower portion of the hole, therefore providing total and full opening of the pressure release hole, in order to eliminate vacuum from the interior of the packing.

Following this process, upon removing the seal (5), for the first use of the product, and as shown by FIGS. 2 and 8 of the drawings, the stem portion (11) located within the vacuum or pressure releasing hole (6), when applied upwards, breaks the film (10), to which it is connected, removing or pulling out a central portion of said film (10), therefore liberating, totally, the hole (6), and breaking the vacuum formed within the empty space (13) normally formed in the upper part of the product (14) within the container, between the product's upper surface and the lower face of the lid (1) causing the easy removal of the metal lid, as shown in FIG. 3.

An additional advantage of this process relative to the production of the vacuum or pressure releasing hole and respective seal, for metal lids used in vacuum sealing, is the fact that, using the resin-like material ("plastisol" or similar compound) to form the removable seal (5), its solidification is achieved by vulcanization, and not only by a simple gluing, avoiding the possibility of, after the first opening of the lid and removal of the seal (5), it may be reapplied or replaced under the same conditions for fixing and adherence, with the purchaser or client noticing, immediately, eventual violation of the packing, in the sale station, for after the removal of such seal, the lid will remain free, due to elimination of vacuum, the only element which retains the metal lid in place, and the purchaser will not accept the packaging in such a condition.

It should be noticed, further, that the making of the vacuum or pressure release hole and the respective seal under the new process, has additional advantages, such as the fact that the metal lid, normally lined with a sanitary varnish (7) in its lower face, which contacts the food product, will not have an interruption in its protective layer or film, thanks to the melting characteristics of the sanitary varnish (7) and of the resin-like material ("plastisol") which forms the seal (5) and the thin film (10), made of the same material, of controlled adherence, providing the lid with a perfect and total protection against oxidation, a fact that represents a guaranty of integrity to the lid and to the food products packed in such type of packing material.

Another advantage to be taken into consideration, in this system of vacuum sealing of glass tumblers by metal lids having a vacuum or pressure release hole and a removable seal, manufactured as per this new process, is that this type of packing becomes easy to be opened, by simple removal of the seal (5) from the vacuum or pressure release hole (6), without the need to use any special instrument or tool, or without the use of any efforts by the person who is opening the unit, and offering, as an additional advantage, the fact that the glass tumblers may be made with relatively thinner walls, without the undesirable heavy rim along their mouths, therefore providing, for the glasses, economy in material, and a more pleasant and appropriate look, for their later use as domestic drinking glasses, as shown, elucidatively and comparatively, in FIG. 11, with real advantages when compared with other glass containers sealed with metal lids with beading and flanging operation, which require heavier glass walls, to resist the impact of the beading clamps, and the formation of heavy beads (15) along the edges of the glass containers, for the beading of the metal lids, as shown in FIG. 12 of the drawings.

As noticed, this new process for the manufacture of a vacuum or pressure releasing hole and respective removable seal, the object of this invention, provides the metal lids so produced with the following advantages:

a) offers complete and perfect protection to the metal plate of the lid, against acid substances contained in foodstuff, mainly preserves and food products preserved in brine, avoiding oxidation and contamination of the products, and assuring the integrity and durability of the metal lid, thanks to the total protection provided by the film (10) applied to the lower portion of the vacuum and pressure release hole (6), protecting the cut edges or rims (9) of such a hole (6).

b) avoids the running or pouring out of the resin-like material ("plastisol"), which forms the removable seal (5), when it is applied, in the liquid state, to the concave circular depression (4), and avoiding the passage of such material towards the lower portion of the hole (6) and the undesirable formation of a bead (12), which hinders the easy removal of the seal and of the lid, by the liberation and clearing of the vacuum and pressure release hole (6) upon the removal of said seal (5).

c) thanks to the breaking of the thin film (10), connected by fusion to the lower portion of the stem portion (11), a total and guaranteed opening of the vacuum release hole (6), with the efficient elimination of vacuum, for easy removal of the metal lid, is offered by this system, due to the mechanical weakness of said thin film (10).

What is claimed is:

1. A process of forming a lid for vacuum sealing a container, the lid adhering to the container by no more than a vacuum formed within the container, the process comprising the steps of:

disposing a concave depression on an upper side of a substantially circular panel having a flanged perimeter;

disposing a sanitary varnish on a lower side of the circular panel;

forming a pressure release hole extending through the concave depression of the circular panel;

applying a first adhesive material to the lower side of the circular panel by fusion to the sanitary varnish to form a thin film over the release hole; and depositing a second adhesive material in the concave depression on the upper side of the circular panel to form a removable seal, the second adhesive material having the same properties as the first adhesive material.

2. The process as claimed in claim 1, wherein the adhesive material is plastisol.

3. The process of claim 1, wherein the first and second adhesive materials are a vulcanized resin applied in a liquid state that solidifies and adheres to the circular panel and the first and second adhesive materials melt together to form a unitary seal.

* * * * *